(12) United States Patent
Nakajima

(10) Patent No.: US 7,553,088 B2
(45) Date of Patent: Jun. 30, 2009

(54) MICRO LENS ARRAY WITH GUIDE PIN INSERTION HOLES AND ITS MANUFACTURE METHOD

(75) Inventor: Toshihiro Nakajima, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 179 days.

(21) Appl. No.: 11/219,743

(22) Filed: Sep. 7, 2005

(65) Prior Publication Data
US 2006/0068629 A1 Mar. 30, 2006

(30) Foreign Application Priority Data
Sep. 29, 2004 (JP) ............... 2004-283425

(51) Int. Cl.
*G02B 6/38* (2006.01)
*G02B 6/40* (2006.01)
*H01R 13/642* (2006.01)
(52) U.S. Cl. ............... 385/64; 385/82; 439/378
(58) Field of Classification Search ............... 385/64, 385/82; 439/378
See application file for complete search history.

(56) References Cited
U.S. PATENT DOCUMENTS
6,688,782 B1 * 2/2004 Wagner et al. ............... 385/78
6,854,898 B2 * 2/2005 Natori et al. ............... 385/78
6,910,812 B2 * 6/2005 Pommer et al. ............... 385/92
7,036,993 B2 * 5/2006 Luther et al. ............... 385/53
7,128,474 B2 * 10/2006 Giboney et al. ............... 385/92
2004/0067015 A1 4/2004 Nakajima

FOREIGN PATENT DOCUMENTS
JP 2004-138982 5/2004
JP 2004-333692 11/2004

* cited by examiner

*Primary Examiner*—Jerry T. Rahll
(74) *Attorney, Agent, or Firm*—Dickstein Shapiro LLP

(57) ABSTRACT

A micro lens array has a translucent substrate of glass or the like and convex lenses formed on a principal surface of the substrate. Guide pin insertion holes are formed through the substrate 30 on opposite sides of a line of lenses. A metal layer 38 with at least three metal projections is formed only in an inner wall section of each of the holes by a plating process so as to gradually increase an opening size of the hole at higher positions. The inner wall section has a depth of about 50 to 100 μm from the opening end on the guide pin insertion side. The metal layer may be omitted. Instead of the metal projections, a metal layer forming the hole having a polygonal shape may be used.

10 Claims, 13 Drawing Sheets

US 7,553,088 B2

MICRO LENS ARRAY WITH GUIDE PIN INSERTION HOLES AND ITS MANUFACTURE METHOD

CROSS REFERENCE TO RELATED APPLICATION

This application is based on and claims priority of Japanese Patent Application No. 2004-283425 filed on Sep. 29, 2004, the entire contents of which are incorporated herein by reference.

BACKGROUND OF THE INVENTION

A) Field of the Invention

The present invention relates to a component with guide pin insertion holes such as a micro lens array and its manufacture method.

B) Description of the Related Art

Micro lens arrays are used in the field of optical fiber technologies. A micro lens array has, for example, a substrate made of quartz, a plurality of convex lenses formed on the substrate, and a plurality of guide pin insertion holes. By inserting guide pins into guide pin insertion holes, each convex lens of the micro lens array is aligned in position with each optical fiber of an optical fiber array.

SUMMARY OF THE INVENTION

An object of the present invention is to provide a component with guide pin insertion holes relative to which guide pins can be easily inserted and drawn.

Another object of the present invention is to provide a component with guide pin insertion holes capable of being manufactured easily.

Still another object of the present invention is to provide a manufacture method for a novel component with guide pin insertion holes which holes can be formed at a high precision.

According to one aspect of the present invention, there is provided a component with guide pin insertion holes comprising: a first member formed with guide pin insertion holes into which guide pins are inserted; and a second member formed in an inner wall section of each of the guide pin insertion holes only in a limited depth section, the second member guiding a guide pin by a plurality of contact points dispersively disposed along a circumferential direction of an opening of the guide pin insertion hole.

According to another aspect of the present invention, there is provided a manufacture method for a component with guide pin insertion holes, comprising steps of: (a) forming a first resist pattern on a principal surface of a substrate, the first resist pattern having a first opening of hole and a second opening of groove continuous with the first circular opening; (b) performing a removal process using the first resist pattern as a mask to form a hole corresponding to the first opening and a first groove corresponding to the second opening along a depth direction of the substrate from a principal surface side; (c) removing the first resist pattern; (d) forming a plating underlying layer covering bottoms of the hole and the first groove; (e) plating a conductive layer covering the plating underlying layers to a thickness exposing inner wall sections of the hole and the first groove near opening ends; (f) forming a second resist pattern on the conductive layers, the second resist pattern dispersively defining a plurality of contact points when a guide pin is inserted into the hole; (g) forming a guide metal layer on the conductive layer by plating metal different from material of the conductive layer on the conductive layer, by using the second resist pattern as a mask; (h) removing the second resist pattern; (i) polishing the substrate from a bottom to expose the conductive layers; and (j) etching the conductive layers to leave the guide metal layer.

DESCRIPTION OF THE PREFERRED EMBODIMENTS

Figure 32:
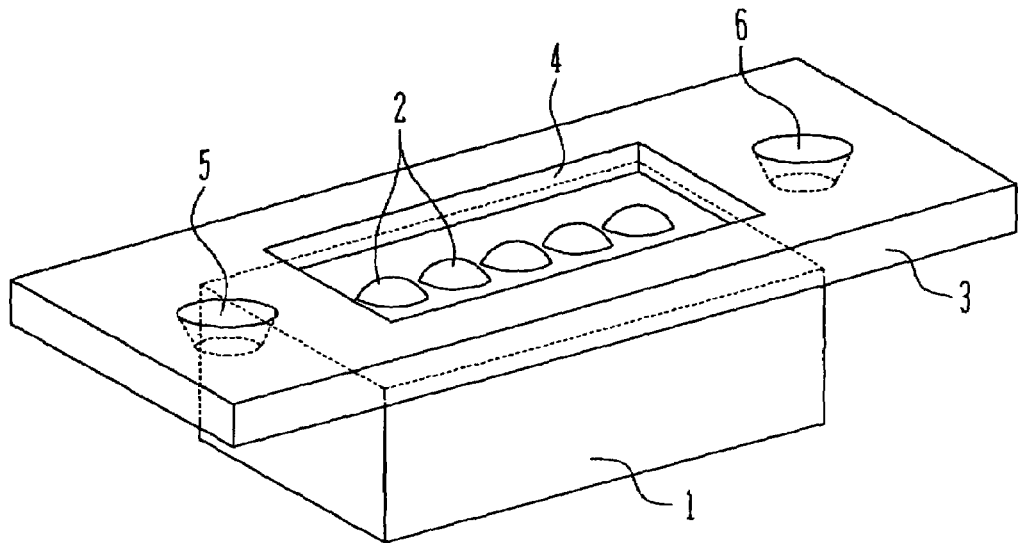
FIG. 32 is a perspective view of a micro lens array according to the inventor's prior proposal.

Prior to describing the present invention, a micro lens array proposed by the present inventor in U.S. patent application Ser. No. 10/678,067 will be described, the entire contents of which are incorporated herein by reference. With reference to FIG. 32, a first micro lens array will be described.

The micro lens array shown in FIG. 32 has a quartz substrate 1 formed with a plurality of convex lenses on one principal surface thereof and a metal coupling plate 3 formed on the principal surface of the substrate 1 via a plated underlying film. The coupling plate 3 is formed with a window 4 for allowing light to pass through and guide pin insertion holes 5 and 6 on opposite sides of the window 4. Guide pins can be inserted easily into the holes 5 and 6 because the size (diameter) thereof gradually increases at higher positions.

When the micro lens array shown in FIG. 32 is to be assembled, in the state that another principal surface of the substrate 1 is directed to the top surface of an optical fiber array, guide pins are inserted from the large size side of the holes 5 and 6 into the holes and retained in guide pin holding grooves (or holes) of the optical fiber array.

Next, a second micro lens array will be described with reference to FIGS. 33 and 34. This micro lens array has a translucent substrate 10 and convex lenses 12 formed on a principal surface of the substrate 10. A guide pin insertion hole 13 such as shown in FIG. 34 is formed through the substrate 10. Although a plurality of lenses 12 and holes 13 are formed actually, one lens and one hole are shown for the purposes of drawing simplicity.

Figure 33:
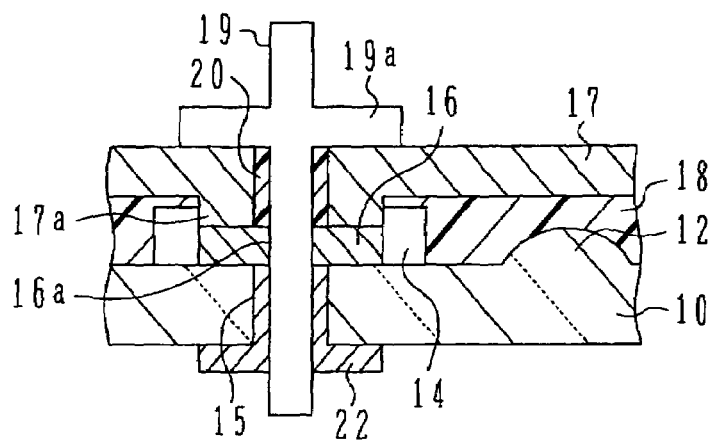
FIG. 33 is a cross sectional view illustrating a plating process in a micro lens array manufacture process studied by the present inventor.
Figure 34:
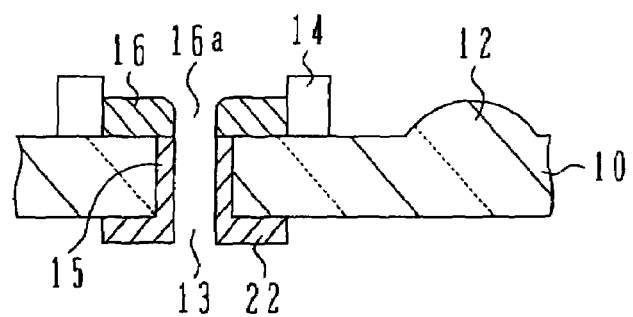
FIG. 34 is a cross sectional view illustrating a resist removing process following the process of FIG. 33.

In forming the guide pin insertion hole 13, as shown in FIG. 33, a ring-shaped position alignment layer 14 made of resist is formed on the principal surface of the substrate 10 and thereafter a semi-through hole having a diameter of about 0.8 mm is formed with a precise drill in the substrate 10 at a center position of the position alignment layer 14. The substrate 10 is polished from the other principal surface to change the semi-through hole to a through hole 15.

Next, a metal plate 16 having a hole of 0.7 mm in diameter is fitted in the hole of the position alignment layer 14. Thereafter, a plating electrode plate 17 is disposed over the substrate 10 via a resist layer 18 to fit a lower protrusion portion 17a of the electrode plate 17 in the hole of the position alignment layer 14. A hole forming pin 19 made of ceramic is inserted into the through hole 15 via a hole of the lower protrusion portion 17a of the electrode plate 17 and a hole 16a of the metal plate 16 to make a flange 19a of the hole forming pin 19 rest on the upper surface of the electrode plate 17. A resist layer 20 is filled in a space between the hole forming pin 19 and electrode plate 17.

In this state, a plating process is performed by flowing current via the electrode plate 17 to form a metal layer 22 extending from the metal plate 16 to the other principal surface of the substrate 10 along the inner wall of the through hole 15. Thereafter, the resist layers 18 and 20 are removed and the electrode plate 17 and hole forming pin 19 are dismounted so that the guide pin insertion hole 13 can be formed. As shown in FIG. 34, the guide pin insertion hole 13 constituted of the hole 16a of the metal plate 16 and a hole (thinner than the through hole 15 by an amount corresponding to the metal layer 22). The hole 16a of the metal plate 16 has a size (diameter) gradually increasing at higher positions so that a guide pin can be inserted easily.

According to the techniques described with reference to FIG. 32, since the coupling plate 3 is formed by a thin film process, both the size and position of the guide pin insertion hole can be set precisely in the order of submicron. However, since the thickness of the coupling plate 3 is about 100 μm because of process restrictions, rigidity may become insufficient if the guide pin is repetitively inserted and drawn out.

According to the guide pin insertion hole forming techniques described with reference to FIGS. 33 and 34, although rigidity is improved, the through hole 15 can be formed only by complicated works such as forming the semi-through hole with the precise drill to form the through hole, fitting the metal plate 16 in the hole of the position alignment layer 14, inserting the hole forming pin 19 into the hole of the electrode plate 17 and the hole 16a of the metal layer 16. There is therefore a possibility of high cost. The position precision of the guide pin insertion hole 13 is determined by two errors: a clearance between the position alignment layer 14 and metal layer 16 and a clearance between the metal layer 16 and hole forming pin 19. Both the clearances are about ±1 μm so that a total position error of ±2 μm is likely to occur. While the guide pin is inserted into or drawing out of the guide pin insertion hole 13, the outer periphery of the guide pin contacts the inner wall of the hole 16a of the metal plate 16 and the inner wall of the hole of the metal layer 22 so that insertion/drawing of the guide pin is not easy in some cases.

Improved techniques on guide pin insertion/drawing have been desired.

Next, description will be made on micro lens arrays according to embodiments of the present invention.

Figure 1:
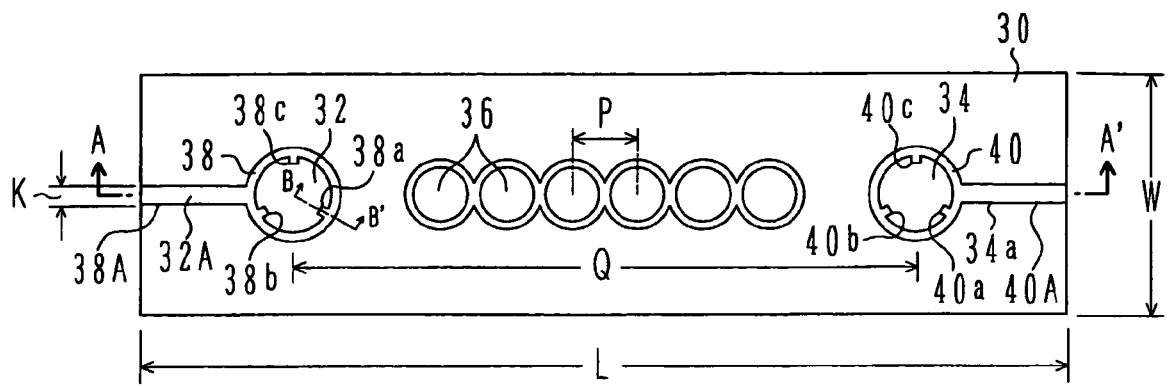
FIG. 1 is a plan view of a micro lens array according to an embodiment of the present invention.
Figure 2:
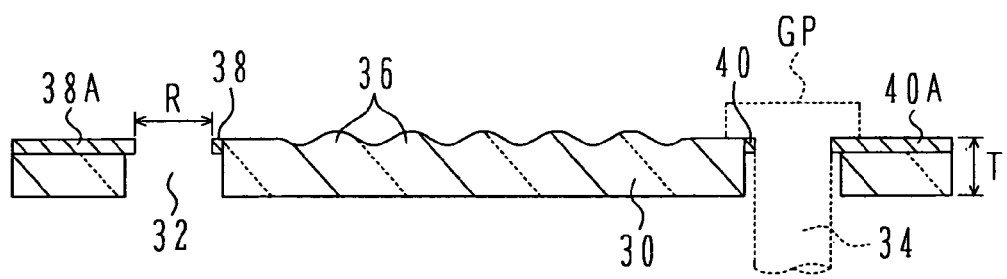
FIG. 2 is a cross sectional view taken along line A-A' of FIG. 1.
Figure 3:
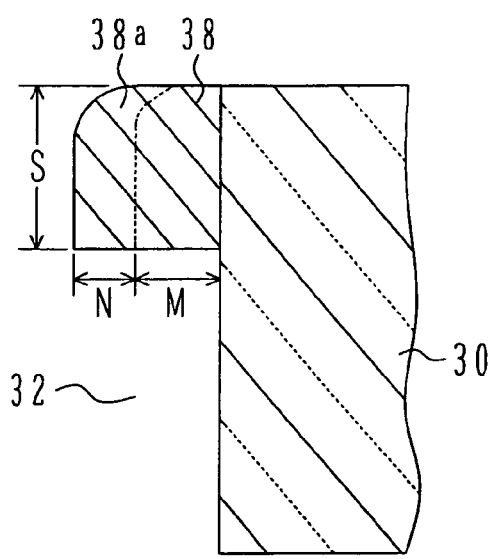
FIG. 3 is a cross sectional view taken along line B-B' of FIG. 1.

FIG. 1 shows a micro lens array according to an embodiment of the present invention, FIG. 2 is a cross sectional view taken along line A-A' of FIG. 1, and FIG. 3 is a cross sectional view taken along line B-B' of FIG. 1.

A translucent substrate 30 made of, e.g., glass, is a rectangular solid with a length L of 8 mm, a width W of 4 mm and a thickness T of about 0.5 to 1 mm. On one principal surface of the substrate 30, a plurality of convex lenses 36, e.g., six convex lenses, are formed in line. A pitch P between adjacent lenses (distance between centers of adjacent lenses) is 250 μm.

Figure 4:
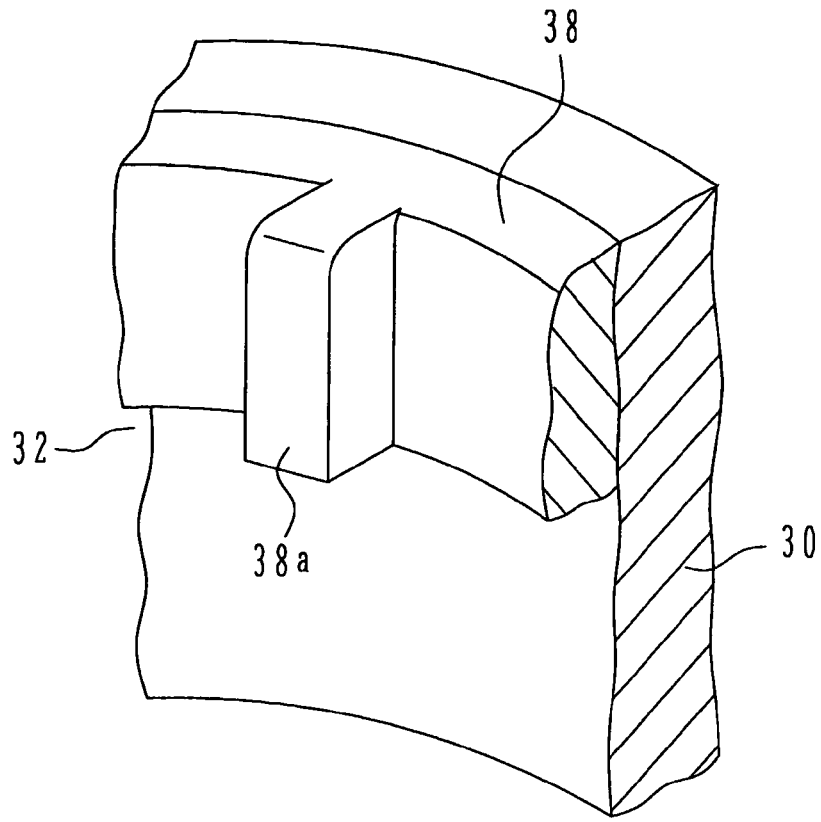
FIG. 4 is a perspective view of a metal layer and a metal projection in a guide pin insertion hole.
Figure 5:
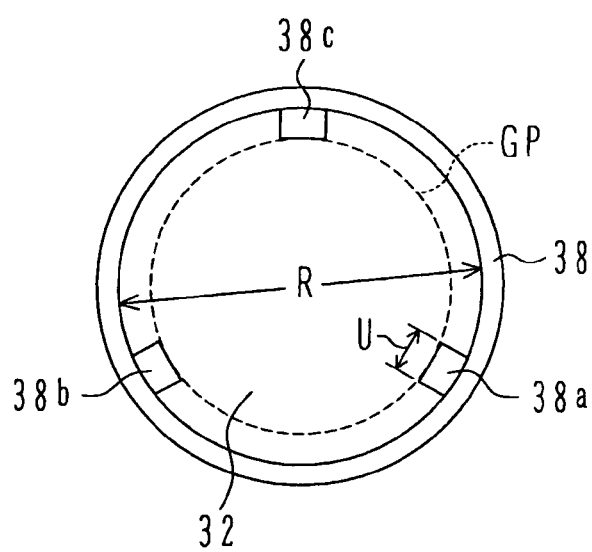
FIG. 5 is a plan view of a metal layer and metal projections in a guide pin insertion hole.

Circular guide pin insertion holes 32 and 34 are formed through the substrate 30 on both sides of the line of lenses 36. A distance Q between the centers of the guide pin insertion holes 32 and 34 is 4.6 mm. A metal layer 38 is formed by a plating process only on the inner wall section of the guide pin insertion hole 32 near its opening end on the guide pin insertion side (on the side of the principal surface of the substrate 30). The metal layer 38 has three metal projections 38a to 38c disposed at generally an equal interval along the inner circumferential wall of the metal layer. The metal layer 38 and metal projections 38a to 38c are made of, e.g., Ni—Fe alloy. FIG. 4 is a perspective view showing the metal layer 38 and metal projection 38a in the guide pin insertion hole 32, and FIG. 5 is a top view showing the metal layer 38 and metal projections 38a to 38c in the guide pin insertion hole 32.

As shown in FIG. 3, the inner wall section of the guide pin insertion hole 32 near its opening end on the guide pin insertion side has a length S of 50 to 100 μm from the opening end. The metal layer 38 of a belt shape having the length S is formed on this inner wall section. The metal projections 38a to 38c having the length S project from the metal layer 38 toward the center of the guide pin insertion hole 32.

The metal layer 38 and metal projections 38a to 38c are formed in such a manner that as shown in FIGS. 3 and 4, the opening size of the guide pin insertion hole 32 gradually increases at higher positions or toward the principal surface on which the lenses 36 are formed. A guide pin can therefore be inserted easily into the guide pin insertion hole 32.

As shown in FIG. 3, a thickness M of the metal layer 38 as measured from the inner wall of the guide pin insertion hole 32 is set to about 200 μm, a projection height N of the metal projections 38a to 38c is set to about 50 μm, and a width U of the metal projections 38a to 38c is set to about 30 μm.

As shown in FIGS. 2 and 5, a diameter R of the circular hole of the metal layer 38 is set to about 0.7 mm.

A power feeding groove 32A is formed between the guide pin insertion hole 32 and one end of the substrate 30 (left side in FIGS. 1 and 2) to allow power feeding for a plating process. A width K of the power feeding groove 32A is set to about 300 μm. A metal layer 38A is formed in the power feeding groove 32A, one end of the metal layer being continuous with the metal layer 38 and the other end reaching one end of the substrate 30. The metal layer 38A, the metal layer 38 and metal projections 38a to 38c are formed by the same plating process and made of, e.g., Ni—Fe alloy. The metal layer 38A is formed in such a manner that it is filled in the power feeding groove 32A and planarizes the principal surface of the substrate 30. Since the metal layer 38A is integral with the metal layer 38, the metal layer 38 is hard to be peeled off from the internal wall of the guide pin insertion hole 32.

The guide pin insertion hole 34 has the same structure as that of the guide pin insertion hole 32. A metal layer 40 with metal projections 40a to 40c in the guide pin insertion hole 34 is formed in a similar method to that for the metal layer 38 with the metal projections 38a to 38c in the guide pin insertion hole 32. A power feeding groove 34A having the same structure as that of the power feeding groove 32A is formed between the guide pin insertion hole 40 and the other end (right side in FIGS. 1 and 2) of the substrate 30. A metal layer 40A similar to the metal layer 38A is formed in the power feeding groove 34A.

Figure 35:
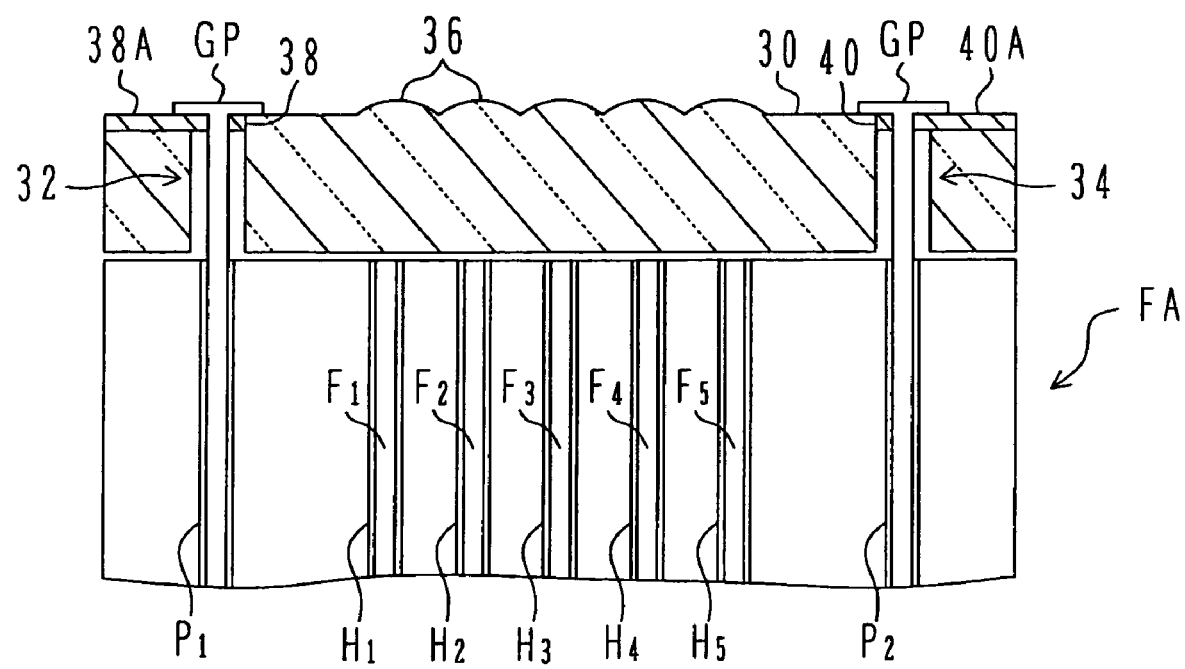
FIG. 35 is a cross sectional view showing a coupling state between a micro lens array and an optical fiber array.

When the micro lens array is to be assembled, as shown in FIG. 35, in the state that another principal surface of the substrate 30 is directed to the end surface of an optical fiber array, guide pins GP are inserted from the principal surface side of the substrate 30 into the guide pin insertion holes 32 and 34 and retained in guide pin holding grooves (or holes) P1, P2 of the optical fiber array FA. Optical fibers F1 to F5 are retained in optical fiber holding grooves H1 to H5 of the optical fiber array FA. The optical fibers F1 to F5 and corresponding lenses 36 can be aligned in position by using the guide pins GP. In the example shown in FIG. 35, the guide pin GP has a circular cross section taken along a plane perpendicular to the longitudinal direction of the guide pin.

In the above-described micro lens array, the metal projections 38a to 38c (40a to 40c) are formed only in the inner wall section of the guide pin insertion hole 32 (34) near its opening end on the guide pin insertion side. Therefore, the guide pin GP does not contact directly the inner wall of the guide pin insertion hole 32 (34) near the opening end thereof, and is guided by three contact points of the metal projections 38a to 38c (40a to 40c) for its insertion/drawing. Insertion/drawing of the guide pin becomes therefore easy. Since the metal projections 38a to 38c (40a to 40c) are not formed extending from one end to other end of the guide pin insertion hole 32 (34), the metal projections 38a to 38c (40a to 40c) can be formed easily by a plating process or the like.

Furthermore, the metal projections 38a to 38c (40a to 40c) are formed in the guide pin insertion hole 32 (34), increasing its opening size at higher positions. Insertion of the guide pin GP becomes easy (to facilitate insertion of the guide pin GP, the guide pin GP may be made thinner toward the distal end thereof). Since the metal layer 38 (40) and metal projections 38a to 38c (40a to 40c) are formed in the inner wall section near the opening end of the guide pin insertion hole 32 (34), it is possible to prevent the opening end of the guide pin insertion hole 32 (34) from being broken or cracked during guide pin GP insertion/drawing. Still further, position alignment becomes easy because a component on which the micro lens array is assembled, such as an optical fiber array, can be visually confirmed via spaces between adjacent metal projections 38a to 38c (40a to 40c).

Figure 6:
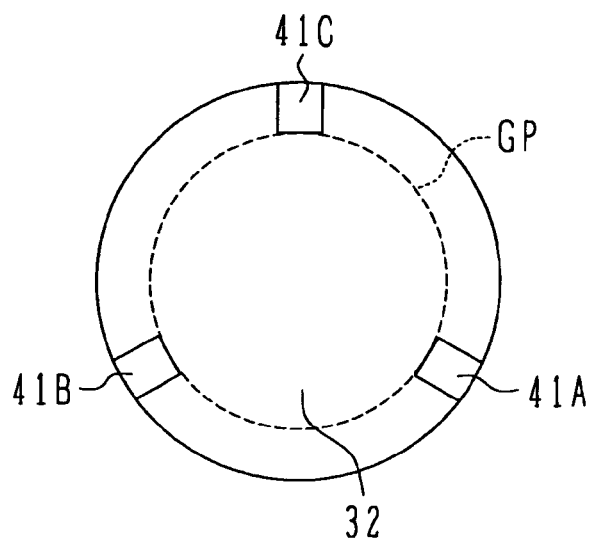
FIGS. 6 to 12 are plan views showing first to seventh modifications of the guide pin insertion hole.

FIG. 6 shows a first modification of the guide pin insertion hole. This modification is characterized in that the metal layer 38 shown in FIG. 5 is not formed, but three metal projections 41A to 41C are formed directly contacting the inner wall of the guide pin insertion hole 32. Similar to the metal projections 38a to 38c, the metal projections 41A to 41C are formed only in the inner wall section near the opening end of the guide pin insertion hole 32 on the guide pin insertion side, gradually increasing the opening size of the guide pin insertion hole 32 at higher positions. Similar operations and effects of the metal projections 38a to 38c (40a to 40c) to those described above can be realized for insertion of the guide pin GP into the guide pin insertion hole 32. In FIGS. 6 to 12, the guide pin is represented by GP.

Figure 7:
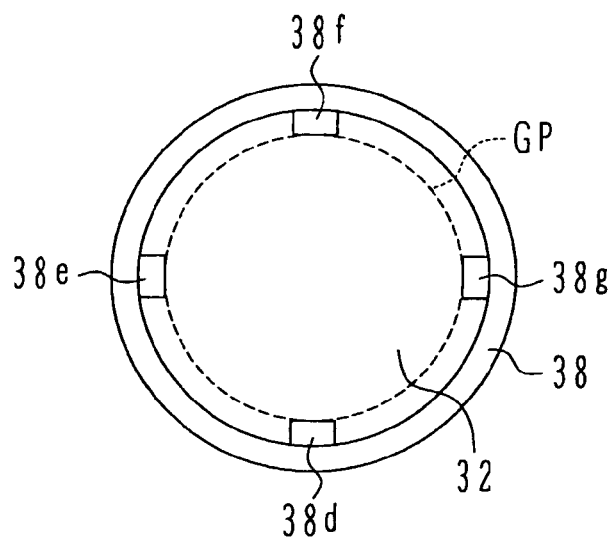

FIG. 7 shows a second modification of the guide pin insertion hole. This modification is characterized in that instead of the three metal projections 38a to 38c, four metal projections 38d to 38g are formed along the inner circumference wall of a metal layer 38. The metal projections 38d to 38g are formed by a similar method to that for the metal projections 38a to 38c and provide similar operations and effects.

Figure 8:
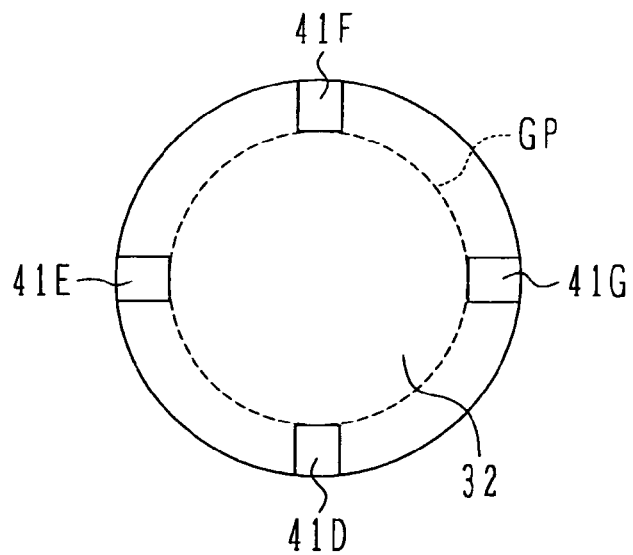

FIG. 8 shows a third modification of the guide pin insertion hole. This modification is characterized in that the metal layer 38 shown in FIG. 7 is not formed, but four metal projections 41D to 41G are formed directly contacting the inner wall of the guide pin insertion hole 32. The metal projections 41D to 41G are formed by a similar method to that for the metal projections 41A to 41C and provide similar operations and effects.

Figure 9:
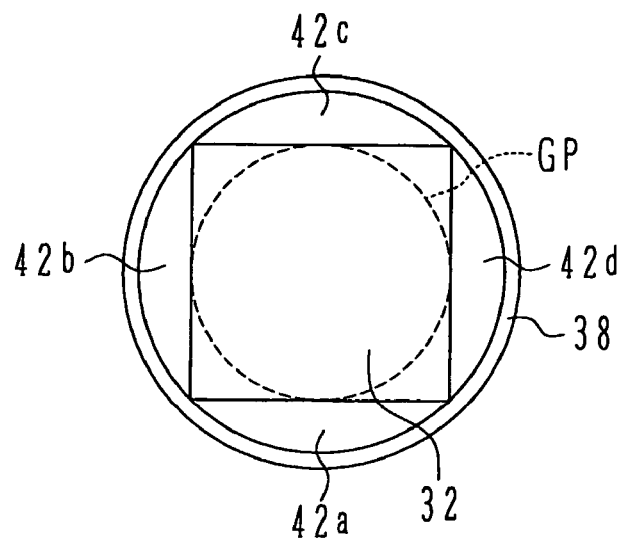

FIG. 9 shows a fourth modification of the guide pin insertion hole. This modification is characterized in that four metal layers 42a to 42d are formed on the inner circumferential wall of a metal layer 38 to form a square opening of the guide pin insertion hole 32. The metal layers 42a to 42d and metal layer 38 are formed by the same plating process, gradually increasing the opening size of the guide pin insertion hole 32 at higher positions.

The guide pin GP is guided by four contact points of the metal layers 42a to 42d for its insertion/drawing near the opening end of the guide pin insertion hole 32 shown in FIG. 9. Insertion/drawing of the guide pin becomes therefore easy. Since the metal layers 42a to 42d are formed gradually increasing the opening size of the guide pin insertion hole 32 at higher positions, the guide pin GP can be inserted easily. Still further, position alignment becomes easy because a component on which the micro lens array is assembled, can be visually confirmed via corner spaces in the rectangular opening formed by the metal layers 42a to 42d.

Figure 10:
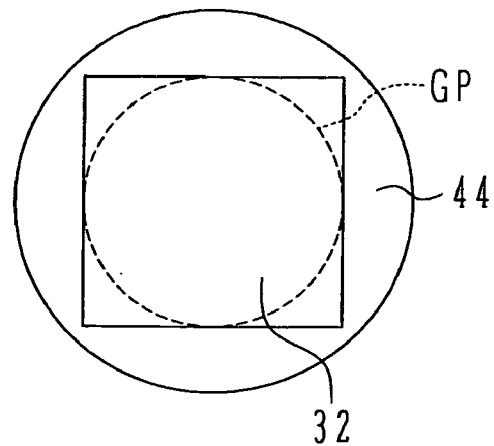

FIG. 10 shows a fifth modification of the guide pin insertion hole. This modification is characterized in that the metal layer 38 shown in FIG. 9 is not formed, but a metal layer 44 is formed directly contacting the inner wall of the guide pin insertion hole 32 to form a square opening of the guide pin insertion hole 32. Also in this case, it is possible to obtain similar operations and effects to those described with reference to FIG. 9. In the modification shown in FIG. 10, instead of the single metal layer 44, the four metal layers 42a to 42d shown in FIG. 9 may be formed, whereas in the modification shown in FIG. 9, instead of the four metal layers 42a to 42d, the single metal layer 44 shown in FIG. 10 may be formed.

Figure 11:
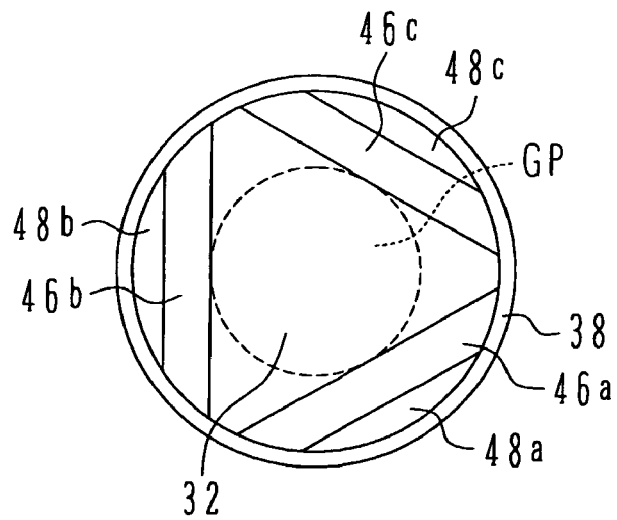

FIG. 11 shows a sixth modification of the guide pin insertion hole. This modification is characterized in that three metal layers 46a to 46c are formed along and on the inner circumferential wall of the metal layer 38 in a beam shape with gap portions 48a to 48c to form generally a triangular opening of the guide insertion hole 32. The metal layers 46a to 46c and metal layer 38 are formed by the same plating process, gradually increasing the opening size of the guide pin insertion hole 32 at higher positions.

The guide pin insertion hole shown in FIG. 11 provides similar operations and effects to those described with reference to FIG. 9. Furthermore, since the metal layers 46a to 46c are formed in a beam shape with the gap portions 48a to 48c, a central portion (a contact point of the guide pin GP) of each of the metal layers 46a to 46c can be displaced toward the inner wall of the guide pin insertion hole 32 during insertion/drawing of the guide pin GP, facilitating insertion/drawing of the guide pin GP.

Figure 12:
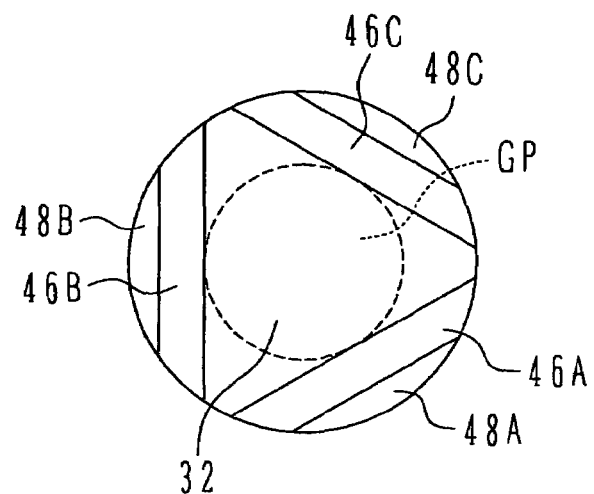

FIG. 12 shows a seventh modification of the guide pin insertion hole. This modification is characterized in that the metal layer 38 shown in FIG. 11 is not formed, but three metal layers 46A to 46C are formed directly contacting the inner wall of the guide pin insertion hole 32 to form generally a triangular opening of the guide insertion hole 32. The metal layers 46A to 46C with gap portions 48A to 48C are formed in a beam shape along and on the inner circumferential wall of the guide pin insertion hole 32, gradually increasing the opening size of the guide pin insertion hole at higher positions.

The guide pin insertion hole shown in FIG. 12 provides similar operations and effects to those described with reference to FIG. 11. The structure with the gap portions such as shown in FIGS. 11 and 12 may be applied to the guide pin insertion holes such as shown in FIGS. 9 and 10.

In the above-described embodiment and modifications, the number of metal projections may be increased more than three. The metal layers defining an opening of the guide pin insertion hole may be formed to form a polygonal opening having more than four corners.

FIGS. 13 to 31 are diagrams illustrating an example of a manufacture method for the micro lens array shown in FIG. 1. Like elements to those shown in FIGS. 1 to 5 are represented by identical reference numerals. FIGS. 13 to 26 and FIGS. 29 to 31 are cross sectional views taken along line C-C' in FIG. 27 showing one micro lens array region 30A among a number of micro lens array regions disposed on one principal surface of a substrate 30 in a matrix shape.

Figure 13:
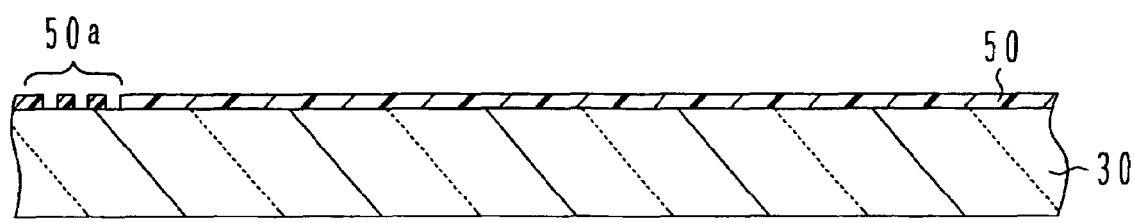
FIG. 13 is a cross sectional view illustrating a resist layer forming process of a manufacture method for the micro lens array shown in FIG. 1.
Figure 14:
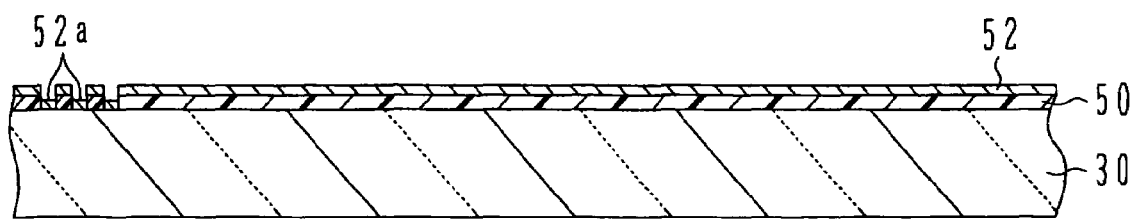
FIG. 14 is a cross sectional view illustrating a Cr layer depositing process following the process of FIG. 13.
Figure 15:
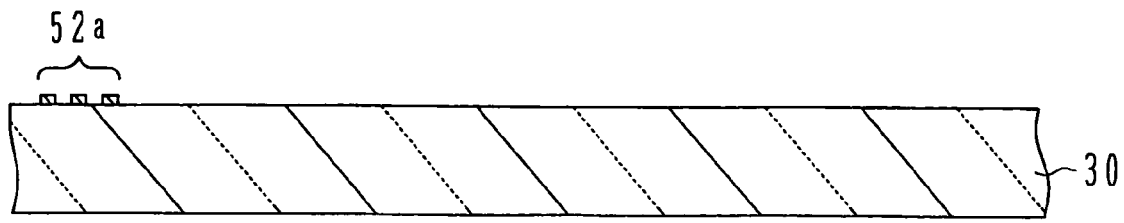
FIG. 15 is a cross sectional view illustrating a lift-off process following the process of FIG. 14.

In a process shown in FIG. 13, on a principal surface of a substrate 30 made of glass, a resist layer 50 is formed by a photolithography process, the resist layer having an alignment mark forming pattern 50a. In a process shown in FIG. 14, a chromium (Cr) layer 52 is deposited on the resist layer 50 and an alignment mark 52a of Cr is deposited on the surface of the substrate 30 by using an alignment mark forming pattern 50a of the resist layer 50, respectively by sputtering. A thickness of the Cr layer 50 is set to 100 nm. In a process shown in FIG. 15, the resist layer 50 together with the Cr layer 52 formed thereon is lifted off (removed) to leave the alignment mark 52a on the principal surface of the substrate 30. The alignment mark is used as an alignment reference in subsequent processes (e.g., a photolithography process) requiring position alignment.

Figure 16:
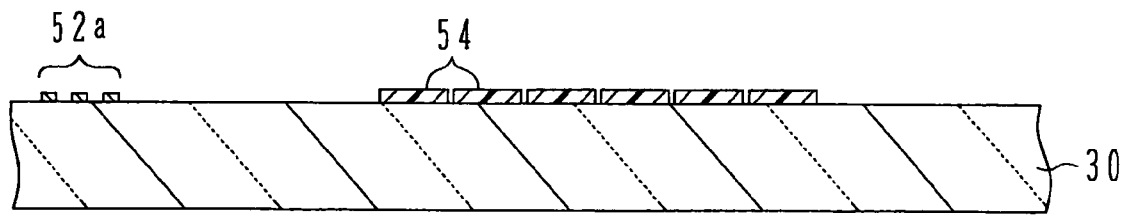
FIG. 16 is a cross sectional view illustrating a resist layer forming process following the process of FIG. 15.
Figure 17:
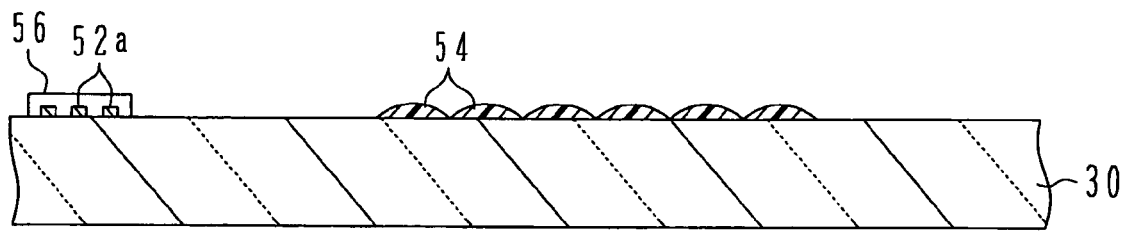
FIG. 17 is a cross sectional view illustrating a heating reflow process following the process of FIG. 16.

In a process shown in FIG. 16, resist layers 54 having a desired lens shape is formed on the principal surface of the substrate 30 by a photolithography process using the alignment mark 52a as a reference. In a process shown in FIG. 17, the resist layers 54 are subjected to a heating reflow process to give a convex lens pattern to each resist layer 54. Thereafter, the alignment mark 52a is covered with a cover layer 56 of a polyimide tape or the like in order to protect the alignment mark 52a from being etched by a next dry etching process.

Figure 18:
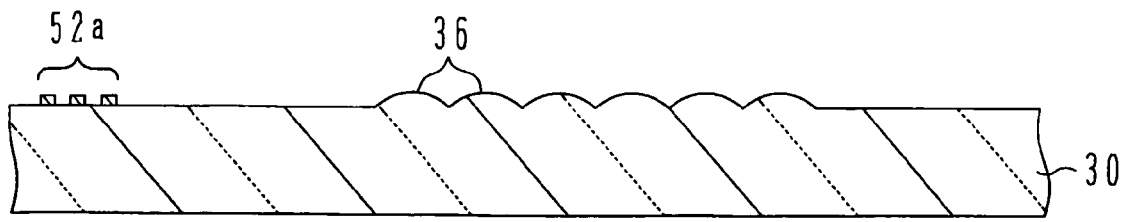
FIG. 18 is a cross sectional view illustrating a dry etching process following the process of FIG. 17.

In a process shown in FIG. 18, in the state that the alignment mark 52a is covered with the cover layer 56, the convex lens patterns of the resist layers 54 are transferred to the principal surface of the substrate 30 by a dry etching process to form lenses 36. The dry etching process may use, as etching gas, fluorine containing gas such as $CHF_3$ and $CF_4$ mixed with $O_2$, Ar and the like. Thereafter, the cover layer 56 is removed to expose the alignment mark 52a.

Figure 19:
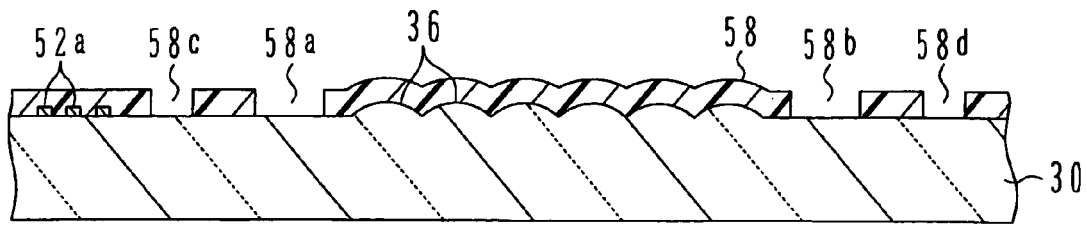
FIG. 19 is a cross sectional view illustrating a resist layer forming process following the process of FIG. 18.
Figure 20:
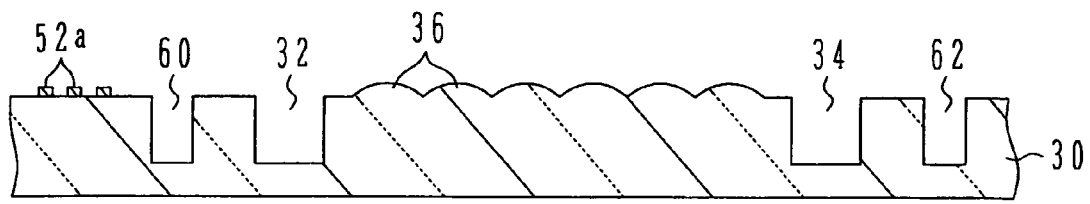
FIG. 20 is a cross sectional view illustrating a sand blast process following the process of FIG. 19.

In a process shown in FIG. 19, a resist layer 58 is formed on the principal surface of the substrate 30 by a photolithography process, the resist layer having holes 58a, 58b, 58c and 58d corresponding to guide pin insertion holes 32 and 34 and power feeding grooves 60 and 62 shown in FIG. 20, respectively. The photolithography process uses the alignment mark 52a as a reference. The resist layer 58 covers a lens area including arrays of lenses 36 and the alignment mark 52a.

In a process shown in FIG. 20, the glass material of the substrate 30 is selectively removed by a sand blast process using the resist layer 58 as a mask to form the guide pin insertion holes 32 and 34 of a concave shape and the power feeding grooves 60 and 62 of a concave shape on the principal surface of the substrate 30. A blast depth is set to about 600 μm. Instead of the sand blast process, a dry (or wet) etching process or the like may be used as the glass removal process. Since the resist layer 58 is used as a mask in the glass removal process, the size and position of the guide pin insertion holes 32 and 34 and power feeding grooves 60 and 62 can be set at a precision of a submicron order.

Figure 21:
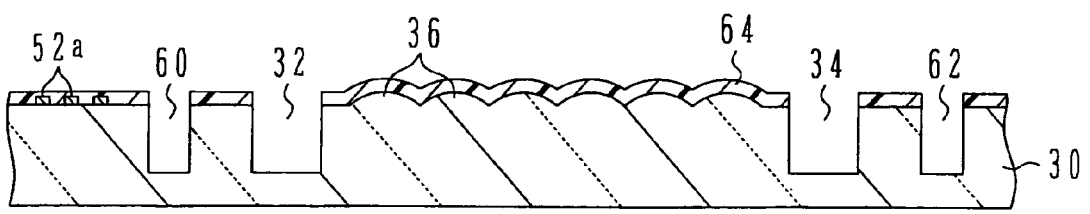
FIG. 21 is a cross sectional view illustrating a resist layer forming process following the process of FIG. 20.

In a process shown in FIG. 21, a resist layer 64 is formed on the principal surface of the substrate 30 by a photolithography process, the resist layer covering the lens area including arrays of lenses 36 and the alignment mark 52a and exposing the guide pin insertion holes 32 and 34 and the power feeding grooves 60 and 62. The photolithography process uses the alignment mark 52a as a reference.

Figure 22:
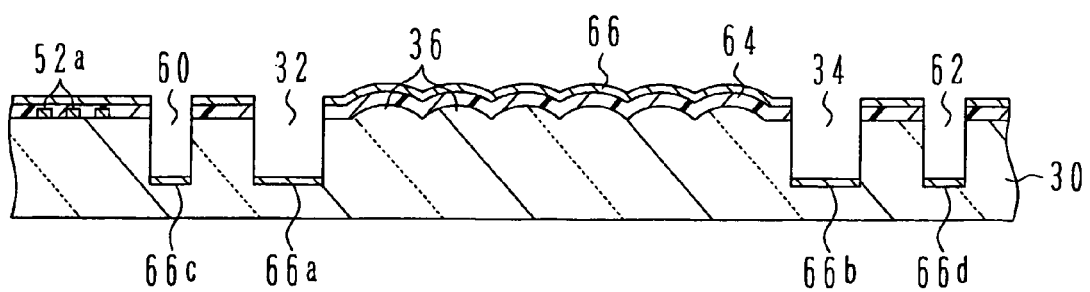
FIG. 22 is a cross sectional view illustrating a Cu/Cr lamination film forming process following the process of FIG. 21.

In a process shown in FIG. 22, Cr and Cu are sequentially deposited on the substrate upper surface by sputtering to form a Cu/Cr lamination layer (having a Cu layer stacked upon a Cr layer) 66 on the resist layer 64 and to form Cu/Cr lamination layers 66a, 66b, 66c and 66d on bottoms of the guide pin insertion holes 32 and 34 and power feeding grooves 60 and 62, respectively. Thicknesses of the Cr layer and Cu layer are set to 30 nm and 300 nm, respectively.

Figure 23:
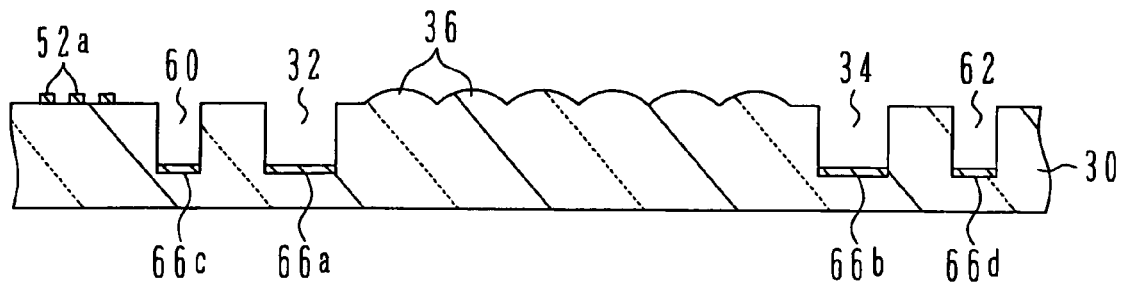
FIG. 23 is a cross sectional view illustrating a lift-off process following the process of FIG. 22.

In a process shown in FIG. 23, the resist layer 64 and Cu/Cr lamination layer 66 formed thereon are lifted off to leave Cu/Cr lamination layers 66a to 66d. The Cu layers constituting the upper layers of the Cu/Cr lamination layers 66a to 66d are used as underlying plating layers, whereas the Cr layers constituting the lower layers of the lamination layers are used for improving tight adhesion of the Cu layers with the substrate 30.

FIG. 27 shows a layout of micro lens array regions in the substrate 30. On the principal surface of the substrate 30, a number of micro lens array regions are disposed in a matrix shape. In the following, one micro lens array region 30A will be described by way of example. The other micro lens array regions have the same structure as that of the micro lens array 30A. The micro lens array 30A is surrounded by power feeding grooves 60, 61, 62 and 63 continuous with each other in a closed loop shape. The power feeding grooves 61 and 63 are formed by the processes shown in FIGS. 19 and 20 of a method similar to that for the power feeding grooves 60 and

62. The other micro lens arrays are also surrounded by power feeding grooves. On the principal surface of the substrate 30, vertical power feeding grooves continuous with the power feeding groove 60 and vertical power feeding grooves continuous with the power feeding groove 62 are formed extending in parallel to a plurality of vertical power feeding grooves similar to the power feeding grooves 60 and 62, and horizontal power feeding grooves continuous with the power feeding groove 61 and horizontal power feeding grooves continuous with the power feeding groove 63 are formed extending in parallel to a plurality of horizontal power feeding grooves similar to the power feeding grooves 61 and 63. In the process shown in FIG. 19, the resist layer 58 is formed so as to form the power feeding grooves surrounding each micro lens array region.

Figure 27:
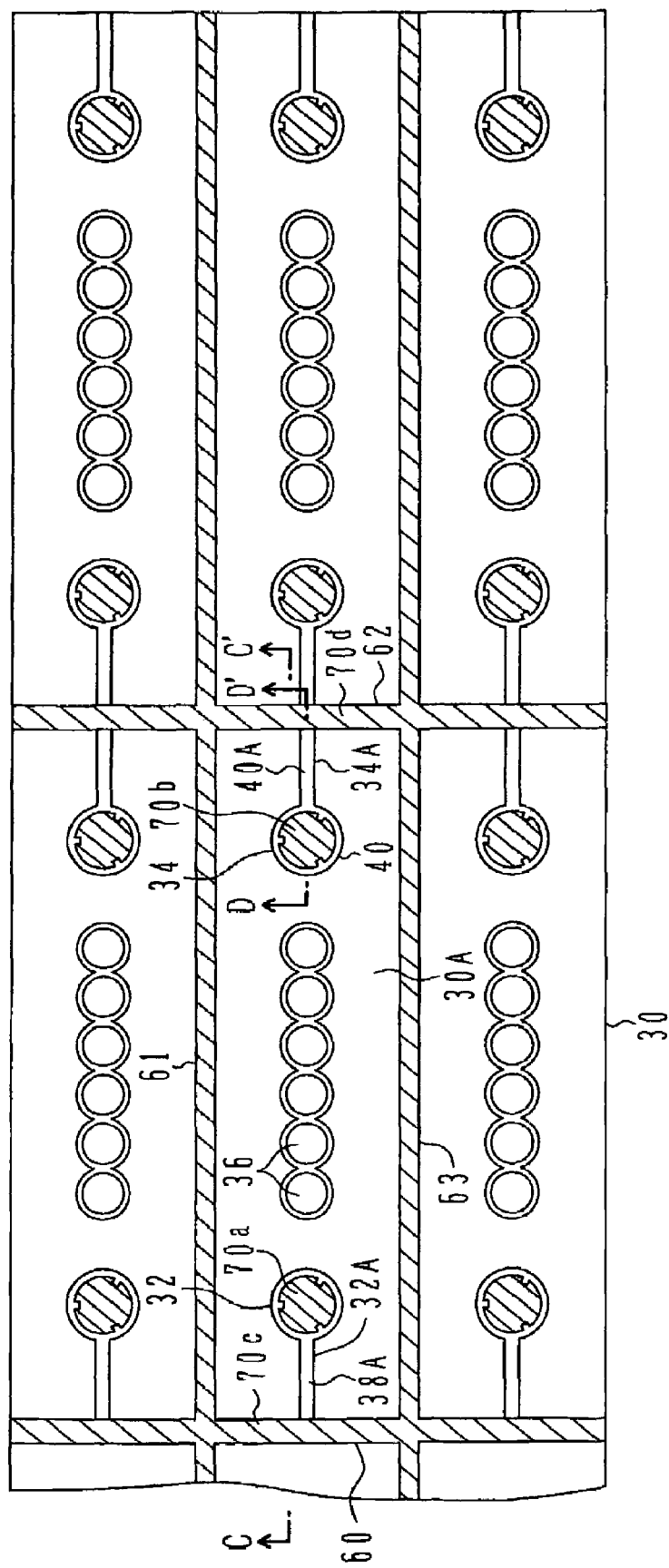
FIG. 27 is a plan view of micro lens array regions in the substrate in the process of FIG. 26.
Figure 28:
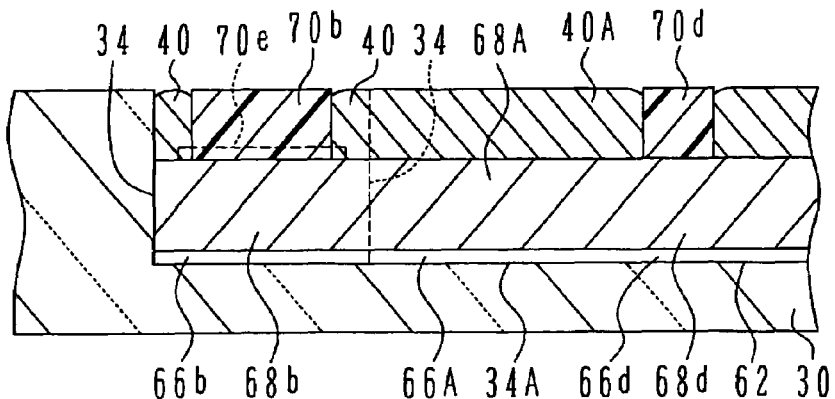
FIG. 28 is a cross sectional view taken along line D-D' of FIG. 27.

FIG. 28 is a cross sectional view of the micro lens array region 30A taken along line D-D' of FIG. 27. The power feeding groove 34A is formed between the guide pin insertion hole 34 and power feeding groove 62, coupling the hole 34 and groove 62. The power feeding groove 34A is formed by the processes shown in FIGS. 19 and 20 of a method similar to that for the guide pin insertion hole 34, power feeding groove 62 and the like. Formed on the bottom of the power feeding groove 34A in the processes shown in FIGS. 21 to 23 are a Cu/Cr lamination layer 66A continuous with the Cu/Cr lamination layers 66b and 66d. Also on the bottom of the power feeding groove 32A, a Cu/Cr lamination layer similar to the Cu/Cr lamination layer 66A is formed. A Cu/Cr lamination layer similar to the Cu/Cr lamination layers 66c and 66d is formed by the processes shown in FIGS. 21 to 23 on the bottom of each of the vertical and horizontal power feeding grooves described with reference to FIG. 27.

Figure 24:
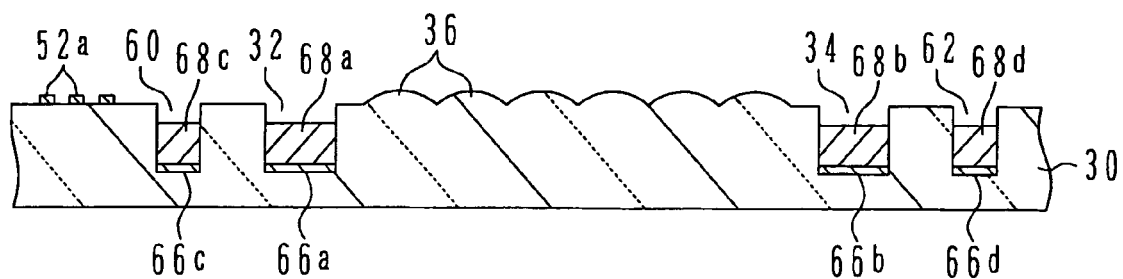
FIG. 24 is a cross sectional view illustrating a Cu plating process following the process of FIG. 23.

In a process shown in FIG. 24, by using the Cu/Cr lamination layers 66c, 66d, . . . as a plating electrode, a Cu plating process is executed to form Cu layers 68a and 68b covering the Cu/Cr lamination layers 66a and 66b in the guide pin insertion holes 32 and 34 and Cu layers 68c and 68d covering the Cu/Cr lamination layers 66c and 66d in the power feeding grooves 60 and 62. The Cu layers 68a to 68d are formed to a thickness that the inner wall section having the length S shown in FIG. 3 is exposed on the side of the principal surface of the substrate 30. In this case, as shown in FIG. 28, a Cu layer 68A being continuous with the Cu layers 68b and 68d and covering the Cu/Cr lamination layer 66A is formed in the power feeding groove 34A, and a Cu layer similar to the Cu layer 68A is also formed in the power feeding groove 32A. A Cu layer similar to the Cu layers 68c and 68d is formed in each of the vertical and horizontal power feeding grooves described with reference to FIG. 27.

Figure 25:
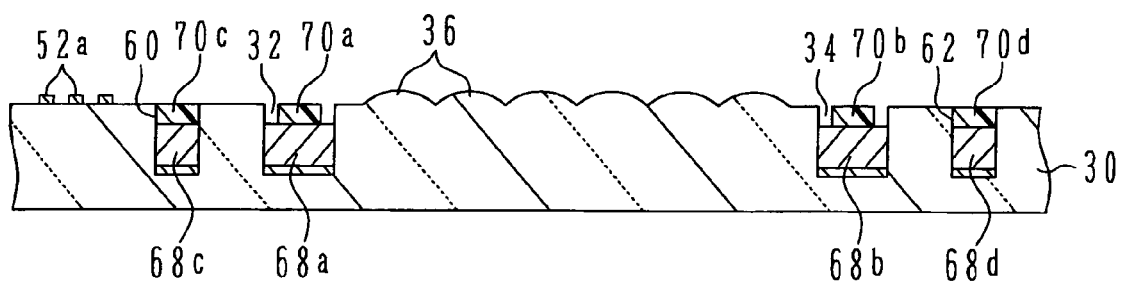
FIG. 25 is a cross sectional view illustrating a resist layer forming process following the process of FIG. 24.

In a process shown in FIG. 25, resist layers 70a and 70b are formed in the guide pin insertion holes 32 and 34 by a photolithography process. The photolithography process uses the alignment mark 25a as a reference. The resist layers 70a and 70b have a pattern matching the metal layer 38 and metal projections 38a to 38c for the embodiment shown in FIG. 1 to 5. The resist layers 70a and 70b have: a pattern matching the metal projections 41A to 41C for the modification shown in FIG. 6; a pattern matching the metal layer 38 and metal projections 38d to 38g for the modification shown in FIG. 7; a pattern matching the metal projections 41D to 41G for the modification shown in FIG. 8; a pattern matching the metal layer 38 and metal projections 42a to 42d for the modification shown in FIG. 9; a pattern matching the metal layer 44 for the modification shown in FIG. 10; a pattern matching the metal layers 38, 46a to 46c and gap portions 48a to 48c; or a pattern matching the metal layers 46A to 46C and gap portions 48A to 48C.

In the process shown in FIG. 25, the photolithography process of forming the resist layers 70a and 70b is used commonly for forming resist layers 70c and 70d covering the Cu layers 68c and 68d in the power feeding grooves 60 and 62. In this case, as shown by hatched areas in FIG. 27, the resist layer is formed in each of the vertical and horizontal power feeding grooves on the upper surface of the substrate 30. The resist layer is not formed in the power feeding grooves 32A and 34A so that the upper surface of the Cu layer (e.g., Cu layer 68A in FIG. 28) is exposed.

Figure 26:
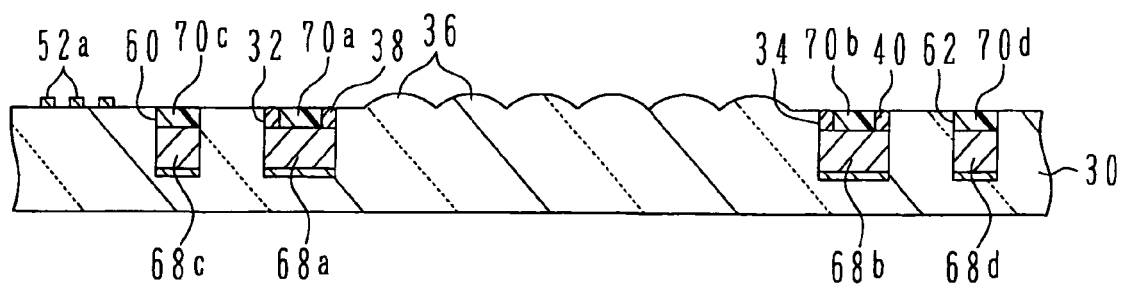
FIG. 26 is a cross sectional view illustrating a Ni—Fe alloy plating process following the process of FIG. 25.

In a process shown in FIG. 26, an Ni—Fe alloy plating process is executed by using the Cu layers 68c, 68d, . . . as a plating electrode and the resist layers 70a to 70d as a mask to form metal layers 38 and 40 of Ni—Fe alloy on the copper layers 68a and 68b. As described with reference to FIGS. 1 to 5, the Cu layers 38 and 40 include the metal projections 38a to 38c and the metal projections 40a to 40c. During this plating process, as shown in the enlarged view of FIG. 28, a supply of metal ions is delayed near at the inner wall of the guide pin insertion hole 34 and near at the side well of the resist layer 70b. Therefore, the metal layer 40 and metal projections 40a to 40c are formed in a tapered (or rounded) shape (the opening defined by the metal layer 40 and metal projections 40a to 40c is thinner at lower positions) as viewed in cross section. The guide pin insertion hole 34 increases therefore the opening size at higher positions so that a guide pin can be easily inserted. This is also true for the metal layer 38 and metal projections 38a to 38c in the guide pin insertion hole 32.

In order to definitely impart the taper shape of the metal layers 38 and 40 and the metal projections 38a to 38c and 40a to 40c, the plating process may be executed by forming under the resist layer 70b a resist layer 70e having a pattern similar to and slightly larger than that of the resist layer 70b. The plating process of this type is disclosed in the above-cited U.S. patent application Ser. No. 10/678,067.

The plating process shown in FIG. 26 also forms a metal layer 40A of Ni—Fe alloy continuous with the metal layer 40 in the power feeding groove 34A as shown in FIGS. 27 and 28. A metal layer 38A of Ni—Fe alloy continuous with the metal layer 38 is also formed in the power feeding groove 32A as shown in FIG. 27. A metal layer of Ni—Fe alloy is not formed in the vertical and horizontal power feeding grooves 60 to 63 and other grooves shown in FIG. 27, because the resist layers 70c and 70d and other resist layers are not formed in these grooves.

Figure 29:
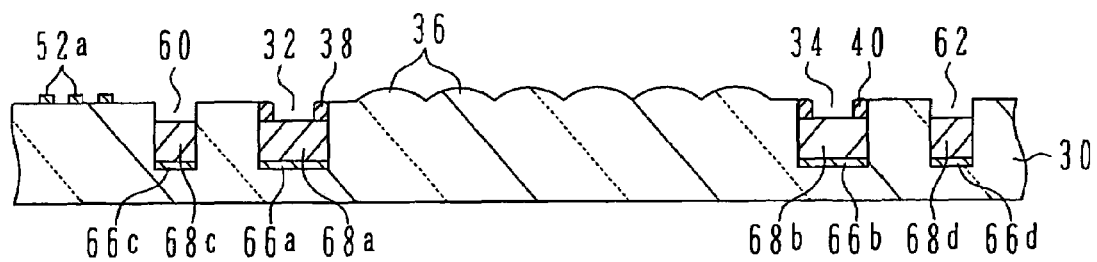
FIG. 29 is a cross sectional view illustrating a resist removing process following the process of FIG. 26.

In a process shown in FIG. 29, the resist layers 70a to 70d and other resist layers are removed so that the metal layers 38 and 40 are left on the Cu layers 68a and 68d in the guide pin insertion holes 32 and 34, and the Cu layers 68c and 68d are exposed in the power feeding grooves 60 and 62.

Figure 30:
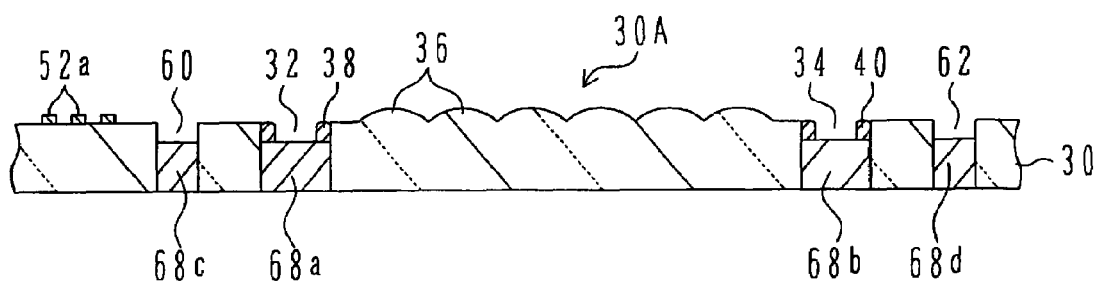
FIG. 30 is a cross sectional view illustrating a substrate bottom polishing process following the process of FIG. 29.

In a process shown in FIG. 30, the substrate 30 is polished from another principal surface (bottom) side to expose the Cu layers 68a to 68d on the substrate bottom. Therefore, the glass material constituting the bottom does not exist in the guide pin insertion holes 32 and 34 and power feeding grooves 60 and 62. This is also true for the vertical and horizontal power feeding grooves shown in FIG. 27.

Figure 31:
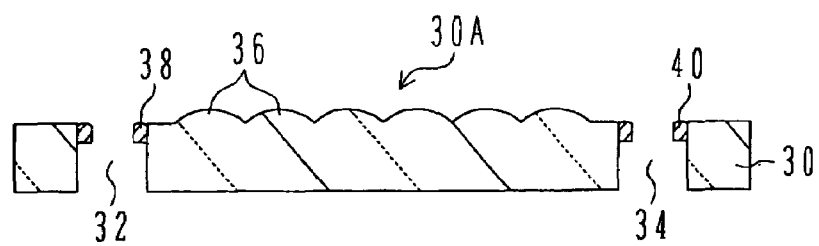
FIG. 31 is a cross sectional view illustrating a Cu removing process following the process of FIG. 30.

In a process shown in FIG. 31, an etching process is executed to remove the Cu layers 68a to 68d and the Cu layers in the vertical and horizontal power feeding grooves shown in FIG. 27. Therefore, the substrate 30 shown in FIGS. 27 and 30 is separated into the micro lens array region 30A and other regions. In the separated micro lens array region 30A, the guide pin insertion holes 32 and 34 are open from one opening ends to the other opening ends, with the metal layers 38 and 40 being formed near at the one opening ends.

According to the manufacture method described with reference to FIGS. 13 to 31, the micro lens array described with reference to FIGS. 1 to 5 can be manufactured easily by thin film forming processes, and the size and position of the guide pin insertion holes 32 and 34 can be set precisely (in the submicron order) because the manufacture method uses the removal process and plating process using the resist layer formed by the photolithography process. The process of forming the guide pin insertion holes 32 and 34 forms at the same time the vertical and horizontal power feeding grooves 60 to 63 and other power feeding grooves, the process of forming the Cu layers 68*a* and 68*b* forms at the same time the Cu layers 68*c* and 68*d* and other Cu layers, the process of removing the Cu layers 68*a* and 68*b* removes at the same time the Cu layers 68*c* and 68*d* and other Cu layers to separate the substrate 30 into micro lens array regions. Accordingly, a dedicated separation process is not necessary and micro lens arrays can be mass-produced with a smaller number of processes and a good manufacture yield.

Figure 36:
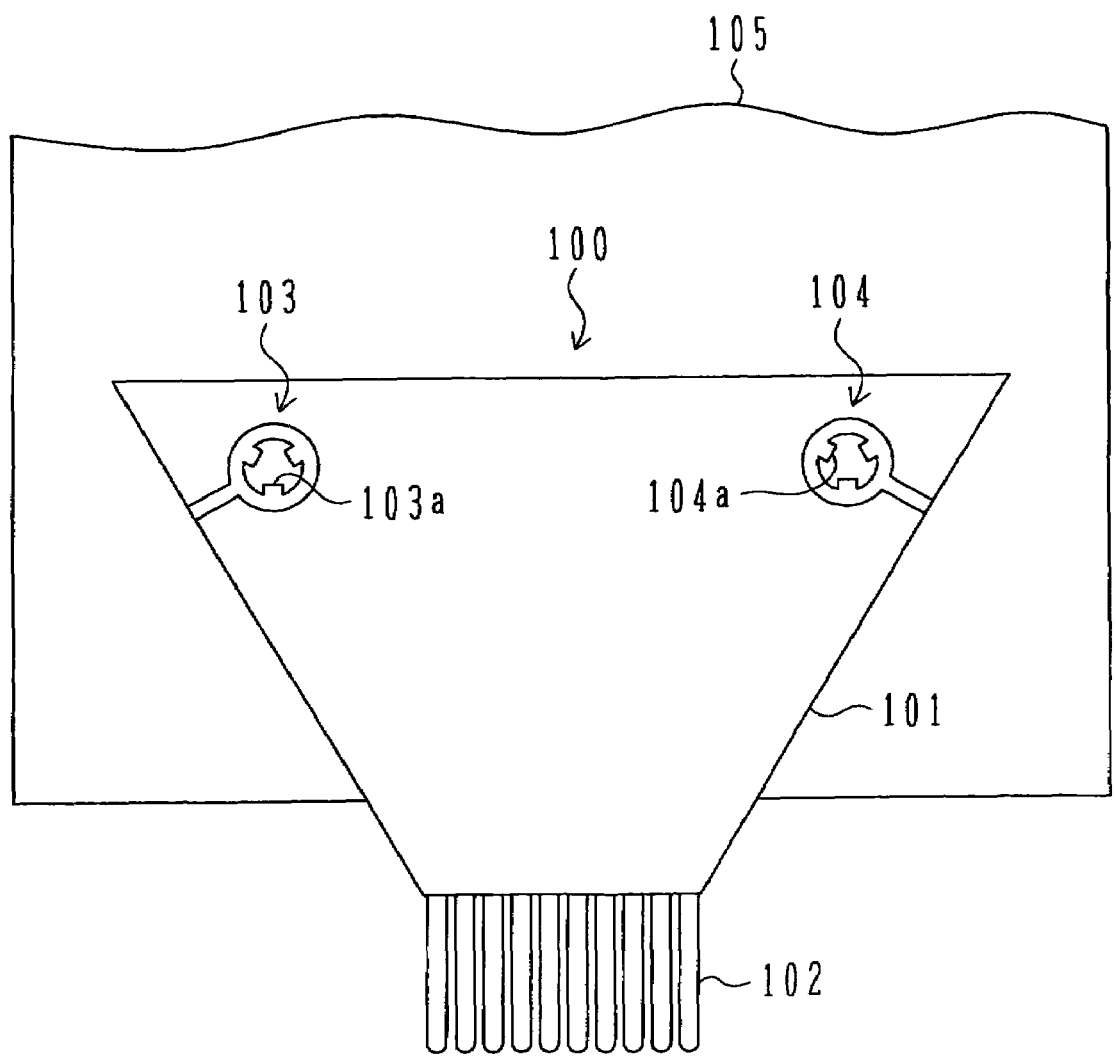
FIG. 36 is a schematic diagram showing a contact probe according to another embodiment of the present invention.

Although a micro lens array is used as an embodiment, the present invention is applicable to other components with guide pin insertion holes. For example, as shown in FIG. 36, this invention is applicable to a contact probe with guide pin insertion holes which probe is used for inspection and evaluation of LSIs and the like. The contact probe 100 has a probe substrate 101, contact pins 102 and guide pin insertion holes 103 and 104. The guide pin insertion holes 103 and 104 have guide pin guiding projections 103*a* and 104*a*, respectively. The guide pin guiding projections 103*a* and 104*a* can be formed by processes similar to those described for a micro lens array. It is possible to adopt the structure that a guide pin is guided by sides of a polygon. By using the guide pins, the contact probe 100 can be aligned with a probe supporter 105.

A first component with guide pin insertion holes of the embodiment has three or more metal projections only in the inner wall section near the opening end on a guide pin insertion side of each guide pin insertion hole.

In the first component with guide pin insertion holes, a plurality of three or more metal projections are formed only in the inner wall section (preferably in the length range from 50 to 100 μm) near the opening end on the guide pin insertion side of each guide pin insertion hole. Therefore, the guide pin will not contact directly the inner wall of the guide pin insertion hole near the opening end of the guide pin insertion hole, and insertion/drawing of the guide pin is guided by three or more contact points (in a small interference state) on the plurality of metal projections so that insertion/drawing is easy. Since the plurality of metal projections are not formed extending from one end to the other of the guide pin insertion hole, the plurality of metal projections can be formed easily by a plating process or the like.

A second component with guide pin insertion holes of the embodiment has one or a plurality of metal layers only in the inner wall section near the opening end on a guide pin insertion side of each guide pin insertion hole, to make an opening shape have a polygonal shape.

In the second component with guide pin insertion holes, one or a plurality of metal layers are formed only in the inner wall section (preferably in the length range from 50 to 100 μm) near the opening end on the guide pin insertion side of each guide pin insertion hole, to make the opening shape have a polygonal shape (e.g., a triangle shape, a rectangular shape and the like). Therefore, insertion/drawing of the guide pin is guided by three or more contact points (in a small interference state) on the polygonal opening so that insertion/drawing is easy. Since one or the plurality of metal layers are not formed extending from one end to the other of the guide pin insertion hole, one or the plurality of metal layers can be formed easily by a plating process or the like.

A first manufacture method for a component with guide pin insertion holes according to the embodiment comprises steps of:

forming a first resist layer on a principal surface of a substrate by a photolithography process, the first resist layer having first and second holes continuous with each other corresponding to desired guide pin insertion holes and power feeding grooves;

forming concave recesses and concave grooves continuous with each other corresponding to the first and second holes of the first resist layer in the substrate on a principal surface side, by a removal process using the first resist layer as a mask;

after removing the first resist mask, forming first and second plating underlying layers continuous with each other covering bottoms of the concave recesses and the concave grooves;

forming first and second conductive layers continuous with each other covering the first and second plating underlying layers to a thickness exposing an inner wall section near an opening end of the concave recess and an inner wall section near an opening end of the concave groove, by a plating process using the second plating underlying layer as a plating electrode;

forming a second resist layer on the first conductive layer in the concave recess by a photolithography process, the second resist layer having a pattern having a plurality of three or more projections in the inner wall section near the opening end of the concave recess;

depositing metal different from a material of the first conductive layer on the first conductive layer, by a plating process using the second conductive layer as a plating electrode and the second resist layer as a mask, to form a plurality of three or more metal projections in the inner wall section near the opening end of the concave recess;

after removing the second resist layer, polishing the substrate from another principal surface side to expose the first and second conductive layers; and removing the first conductive layer by an etching process and leaving the concave recess as a guide pin insertion hole in a state that the plurality of metal projections are formed in the inner wall section near the opening end of the concave recess.

The first manufacture method is suitable for manufacturing the first component with guide pin insertion holes. The concave recess is formed by the removal process (e.g., a sand blast process, a dry or wet etching process and the like) using as a mask the first resist layer formed by the photolithography process, and the plurality of metal projections are formed by the plating process by using as a mask the second resist layer formed by the photolithography process. Both the size and position of the guide pin insertion hole can therefore be set precisely in a submicron order.

The first and second conductive layers are formed on the first and second plating underlying layers in the concave recess and concave groove, and the plurality of metal electrodes are formed by the plating process using the second conductive layer as a plating electrode and the second resist layer as a mask. A plurality of metal projections can therefore be formed easily in the inner wall section near the opening end of the concave recess.

A second manufacture method for a component with guide pin insertion holes according to the embodiment comprises steps of:

forming a first resist layer on a principal surface of a substrate by a photolithography process, the first resist layer having first and second holes continuous with each other corresponding to desired guide pin insertion holes and power feeding grooves;

forming concave recesses and concave grooves continuous with each other corresponding to the first and second holes of the first resist layer in the substrate on a principal surface side, by a removal process using the first resist layer as a mask;

after removing the first resist mask, forming first and second plating underlying layers continuous with each other covering bottoms of the concave recesses and the concave grooves;

forming first and second conductive layers continuous with each other covering the first and second plating underlying layers to a thickness exposing an inner wall section near an opening end of the concave recess and an inner wall section near an opening end of the concave groove, by a plating process using the second plating underlying layer as a plating electrode;

forming a second resist layer having a polygonal pattern on the first conductive layer in the concave recess by a photolithography process;

depositing metal different from a material of the first conductive layer on the first conductive layer, by a plating process using the second conductive layer as a plating electrode and the second resist layer as a mask, to form one or a plurality of metal layers in the inner wall section near the opening end of the concave recess and make an opening shape of the concave recess have a polygonal shape corresponding to the polygonal pattern of the second resist layer;

after removing the second resist layer, polishing the substrate from another principal surface side to expose the first and second conductive layers; and removing the first conductive layer by an etching process and leaving the concave recess as a guide pin insertion hole in a state that the one or a plurality of metal layers are formed in the inner wall section near the opening end of the concave recess.

The second manufacture method is suitable for manufacturing the second component with guide pin insertion holes. Similar to the first manufacture method, according to the second manufacture method, both the size and position of the guide pin insertion hole can therefore be set precisely in a submicron order, and one or the plurality of metal layers can be formed easily in the inner wall section near the opening end of the concave recess.

The first or second manufacture method may be modified in the following manner. In the step of forming the first resist layer, one or a plurality of third resist layers are formed to define, together with the first resist layer, a closed loop hole surrounding a predetermined substrate region including a substrate region corresponding to the first and second holes of the first resist layer; in the step of forming the concave recess and concave groove, a closed loop groove corresponding to the closed loop hole and continuous with the concave groove is formed in the substrate on the principal surface side; in the step of forming the first and second plating underlying layers, after the first and third resist layers are removed, a third plating underlying layer of a closed loop shape is formed which covers the bottom of the closed loop groove and is continuous with the second plating underlying layer; in the step of forming the first and second conductive layers, a third conductive layer of a closed loop shape is formed which covers the third plating underlying layer and is continuous with the second conductive layer; in the step of forming the second resist layer, a fourth resist layer of a closed loop shape is formed on the third conductive layer in the closed loop concave groove; in the plating step using the second resist layer as a mask, the fourth resist layer is used as a mask; in the step of exposing the first and second conductive layers, after the second and fourth resist layers are removed, the third conductive layer is exposed; and in the step of removing the first conductive layer, the third conductive layer is removed to separate the predetermined substrate region from the substrate. In this case, the predetermined substrate region including the guide pin insertion holes can be separated easily from the substrate by using the same processes as those of forming the guide pin insertion holes. This method is suitable for mass production of the component with guide pin insertion holes, forming a number of components with guide pin insertion holes on one substrate and separating the substrate to each component.

According to the techniques disclosed in the embodiment, a plurality of metal projections or one or a plurality of metal layers defining a polygonal opening shape are formed only in the inner wall section near the opening end of a guide pin insertion hole on the guide pin insertion side. Insertion/drawing of a guide pin becomes therefore easy and metal projections or layers can be formed easily.

Concave recesses are formed by the removal process using the resist layer as a mask and metal projections or metal layers are formed by the plating process using the resist layer as a mask. It is therefore possible to form guide pin insertion holes precisely and easily.

The present invention has been described in connection with the preferred embodiments. The invention is not limited only to the above embodiments. It will be apparent to those skilled in the art that other various modifications, improvements, combinations, and the like can be made.

I claim:

1. A component with guide pin insertion holes comprising,
a first member formed with guide pin insertion holes into which guide pins are inserted; and
a second member formed on an inner wall of each of said guide pin insertion holes and extending only partially along a depth of said guide pin insertion hole, said second member guiding a guide pin by a plurality of contact portions dispersively disposed along a circumferential direction of said second member, wherein said second member has an opening in the shape of a polygon, and the guide pin is guided by the contact portions on sides of the polygon.

2. A component with guide pin insertion holes comprising:
a first member formed with guide pin insertion holes into which guide pins are inserted; and
a second member formed on an inner wall of each of said guide pin insertion holes and extending only partially along a depth of said guide pin insertion hole, said second member guiding a guide pin by a plurality of contact portions dispersively disposed along a circumferential direction of said second member, wherein said second member is a metal layer proximal to an opening end of said guide pin insertion hole on a guide pin insertion side, has an opening in the shape of a polygon, and the guide pin is guided by contact portions on sides of the polygon.

3. The component with guide pin insertion holes according to claim 2, wherein said second member includes three or more projections which guide the guide pin.

4. The component with guide pin insertion holes according to claim 2, wherein said second member is formed proximal to an opening end of said guide pin insertion hole on a guide pin insertion side.

5. The component with guide pin insertion holes according to claim 2, wherein said partial depth is in a range from 50 μm to 100 μm from an opening end on a guide pin insertion side.

6. The component with guide pin insertion holes according to claim 2, wherein said first member is an insulating member.

7. The component with guide pin insertion holes according to claim 2, wherein said second member includes three or more metal projections which guide the guide pin.

8. The component of claim 2, wherein said contact portions have a rounded shape which gradually increases the size of the opening on the insertion side of the guide pin.

9. The component with guide pin insertion holes according to claim 2, wherein said first member is a translucent substrate and a plurality of lenses are formed on a surface of said first member.

10. The component with guide pin insertion holes according to claim 9, further comprising:
an optical fiber away having positioning guide pin holding holes; and
guide pins accommodated in said guide pin insertion holes and said guide pin holding holes.

* * * * *